(12) United States Patent
Tsai

(10) Patent No.: US 7,758,254 B2
(45) Date of Patent: Jul. 20, 2010

(54) FIBER CONNECTOR USING HOOKING STRUCTURE

(75) Inventor: Eden Tsai, Shulin (TW)

(73) Assignee: Comoss Electronic Co., Ltd., Taipei (TW)

( * ) Notice: Subject to any disclaimer, the term of this patent is extended or adjusted under 35 U.S.C. 154(b) by 0 days.

(21) Appl. No.: 12/205,850

(22) Filed: Sep. 6, 2008

(65) Prior Publication Data

US 2010/0061682 A1 Mar. 11, 2010

(51) Int. Cl.
*G02B 6/36* (2006.01)
*G02B 6/38* (2006.01)

(52) U.S. Cl. .............................. 385/53; 385/69; 385/86

(58) Field of Classification Search .................... 385/53, 385/69, 86
See application file for complete search history.

(56) References Cited

U.S. PATENT DOCUMENTS

2003/0231836 A1* 12/2003 Robertson et al. .............. 385/55

* cited by examiner

*Primary Examiner*—Uyen-Chau N Le
*Assistant Examiner*—Kajli Prince
(74) *Attorney, Agent, or Firm*—Chun-Ming Shih

(57) ABSTRACT

A fiber connector using a hooking structure includes a fiber connector having a socket and a fastening block disposed inside an upper end of the socket; a fiber positioning piece for inserting in the socket of the fiber connector, the fiber positioning piece having a spring plate extending forwardly from an upper end thereof, and a buckling slot disposed on the spring plate, the buckling slot being provided for the fastening block of the fiber connector to be fastened therein; therefore the hooking structure of the fiber connector is implemented by using these components.

3 Claims, 5 Drawing Sheets

000000# FIBER CONNECTOR USING HOOKING STRUCTURE

BACKGROUND OF THE INVENTION

1. Field of the Invention

The present invention relates to a fiber connector using a hooking structure, and more particularly, to a fiber connector using a hooking structure, which uses a fiber positioning piece to hold a fiber cable stably disposed inside the fiber connector, when the fiber cable is inserted into the fiber connector through the fiber positioning piece, the fiber positioning piece prevents separation of the fiber cable from the fiber connector.

2. Description of the Prior Art

Generally a traditional fiber connector is disposed with a receptacle for insertion of a fiber cable; the end of the common fiber cable is disposed with a connecting end for inserting and connecting with the receptacle of the fiber connector to provide fiber connection.

However, when the fiber cable is inserted in the fiber connector, sometimes it may break off from the fiber connector due to an external force exerted by careless user who accidentally pulls or drags the fiber cable. Therefore, it is inconvenient for users since they have to be careful in using the traditional fiber connector.

Therefore, the traditional fiber connectors present several shortcomings to be overcome.

In view of the above-described deficiencies of the traditional fiber connectors, after years of constant effort in research, the inventor of this invention has consequently developed and proposed a fiber connector using a hooking structure.

SUMMARY OF THE INVENTION

It is an object of the present invention to provide a fiber connector using a hooking structure to let the fiber connector firmly hook with a fiber positioning piece to form in one piece.

The fiber connector using the hooking structure mainly comprises a fiber connector and a fiber positioning piece, wherein the fiber connector comprises a socket disposed on one side and a fastening block disposed inside an upper end of the socket, the fiber connector further comprises a retaining portion disposed at each one of two inner sides respectively; a fiber positioning piece is inserted in the socket on one side of the fiber connector, the fiber positioning piece comprises a spring plate extending forwardly from an upper end thereof, and a buckling slot disposed on the spring plate, wherein the buckling slot is provided for fastening the fastening block of the fiber connector therein, and the buckling slot is formed with a pressing portion at its back end; the fiber positioning piece comprises a tablet extending backwardly from each one of its two sides respectively, with a tab formed on an end portion of the tablet, wherein the tab leans against the retaining portion of the fiber connector; when the fiber positioning piece is inserted into the socket of the fiber connector, the fiber positioning piece is pushed inwardly until the fastening block of the fiber connector fastens with the buckling slot of the fiber positioning piece to form the hooking structure of the fiber connector.

These features and advantages of the present invention will be fully understood and appreciated from the following detailed description of the accompanying Drawings.

DETAILED DESCRIPTION OF THE PREFERRED EMBODIMENT

Figure 1:
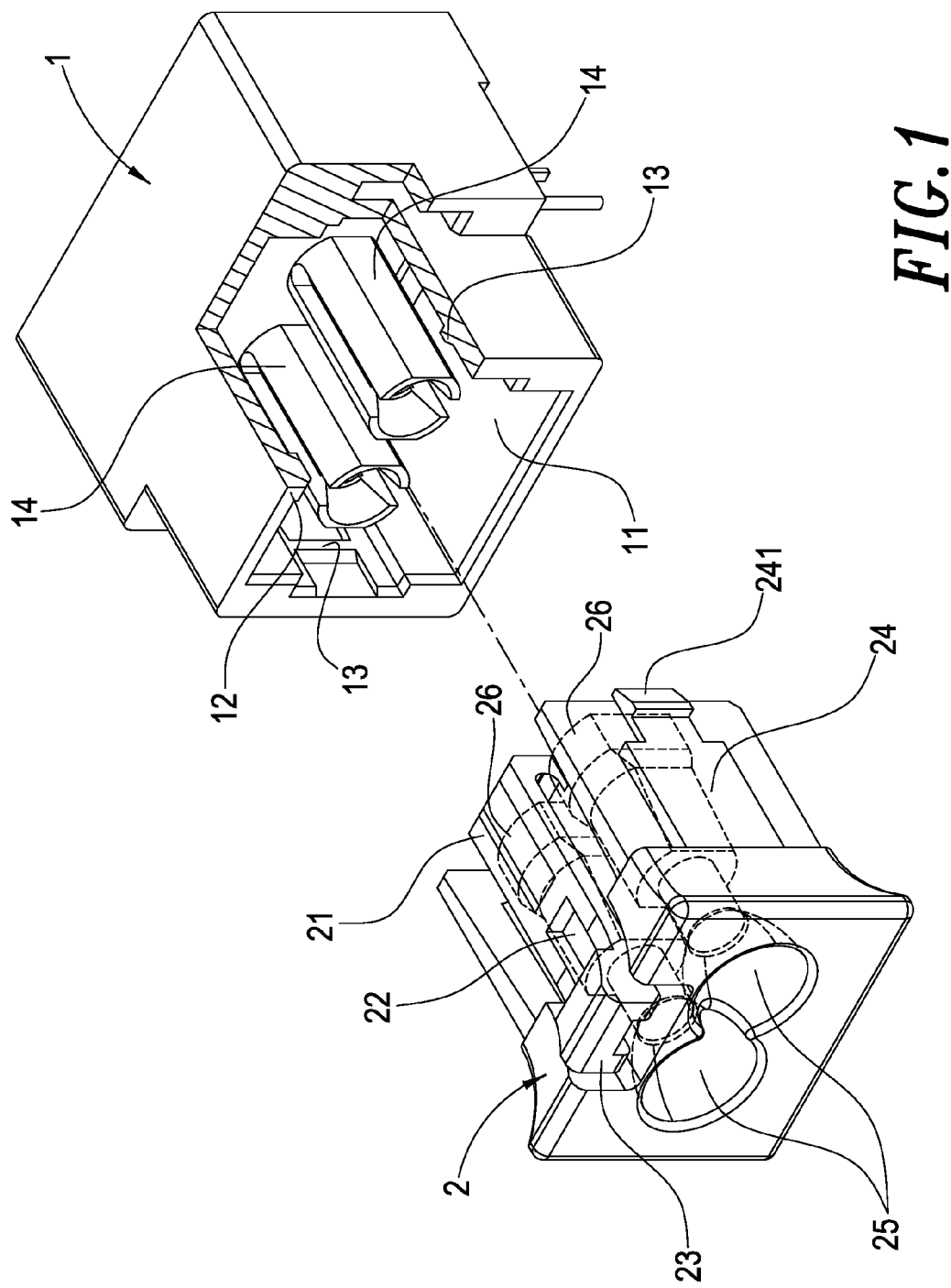
FIG. 1 illustrates a perspective view of a fiber connector using a hooking structure.
Figure 2:
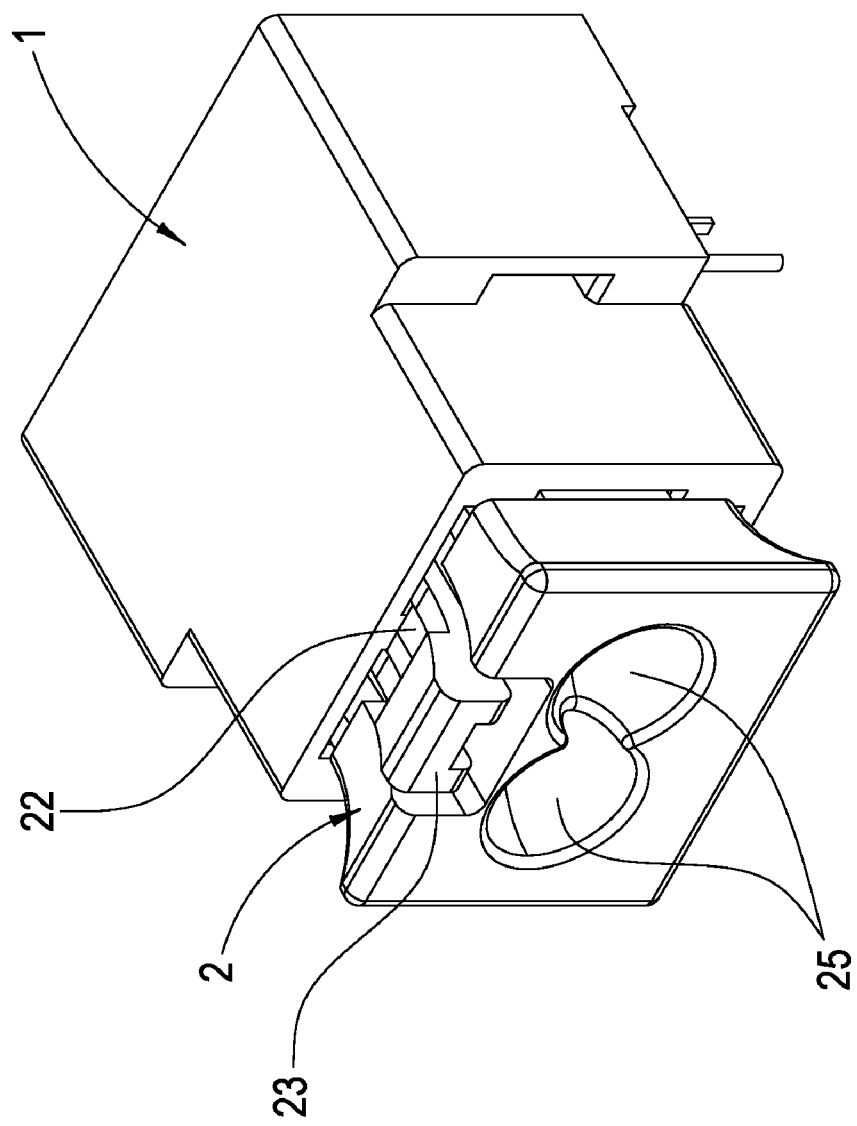
FIG. 2 illustrates a combinational view of the fiber connector using the hooking structure.

Please refer to FIG. 1 and FIG. 2 respectively for a perspective view and a combinational view of a fiber connector using a hooking structure, wherein the hooking structure comprises a fiber connector 1 and a fiber positioning piece 2.

The fiber connector 1 comprises a socket 11 disposed on one side and a fastening block 12 suitably disposed inside an upper end of the socket 11, the fiber connector further comprises a retaining portion 13 disposed at each one of two inner sides respectively, and at least one fiber holding portion 14 is disposed at a bottom end of the socket 11 to hold the fiber cable 3.

The fiber positioning piece 2 comprises a spring plate extending forwardly from an upper end thereof, and a buckling slot 22 suitably disposed on the spring plate, wherein the buckling slot 22 is provided for fastening the fastening block 12 of the fiber connector 1 therein, and the buckling slot 22 is formed with a pressing portion 23 on its back end. The fiber positioning piece comprises two tablet 24 extending backwardly from its two sides with a tab 241 formed on an end portion of the tablet 24 respectively, wherein the tab 241 leans against the retaining portion 13 of the fiber connector 1. The fiber positioning piece 2 also comprises at least one fiber receptacle 25 suitably penetrating through the middle of the fiber positioning piece 2 and a hole 26 formed at one side of the fiber receptacle 25 with respect to the fiber holding portion 14, wherein the fiber positioning piece 2 is inserted in the socket 11 of the fiber connector 1.

Therefore the hooking structure of the fiber connector is implemented by using these components.

Figure 3A:
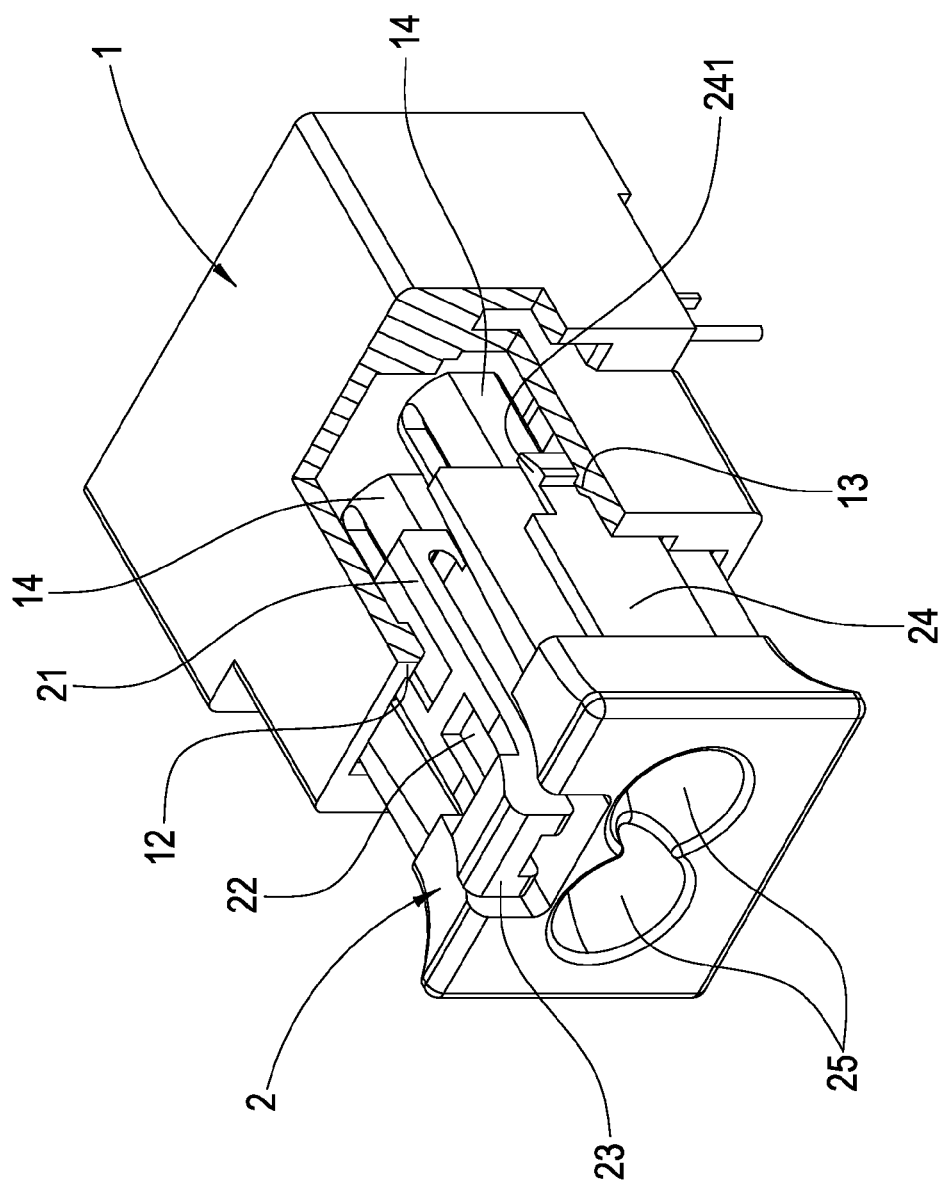
FIGS. 3A, 3B, and 3C illustrate implementation views of the fiber connector using the hooking structure.
Figure 3B:
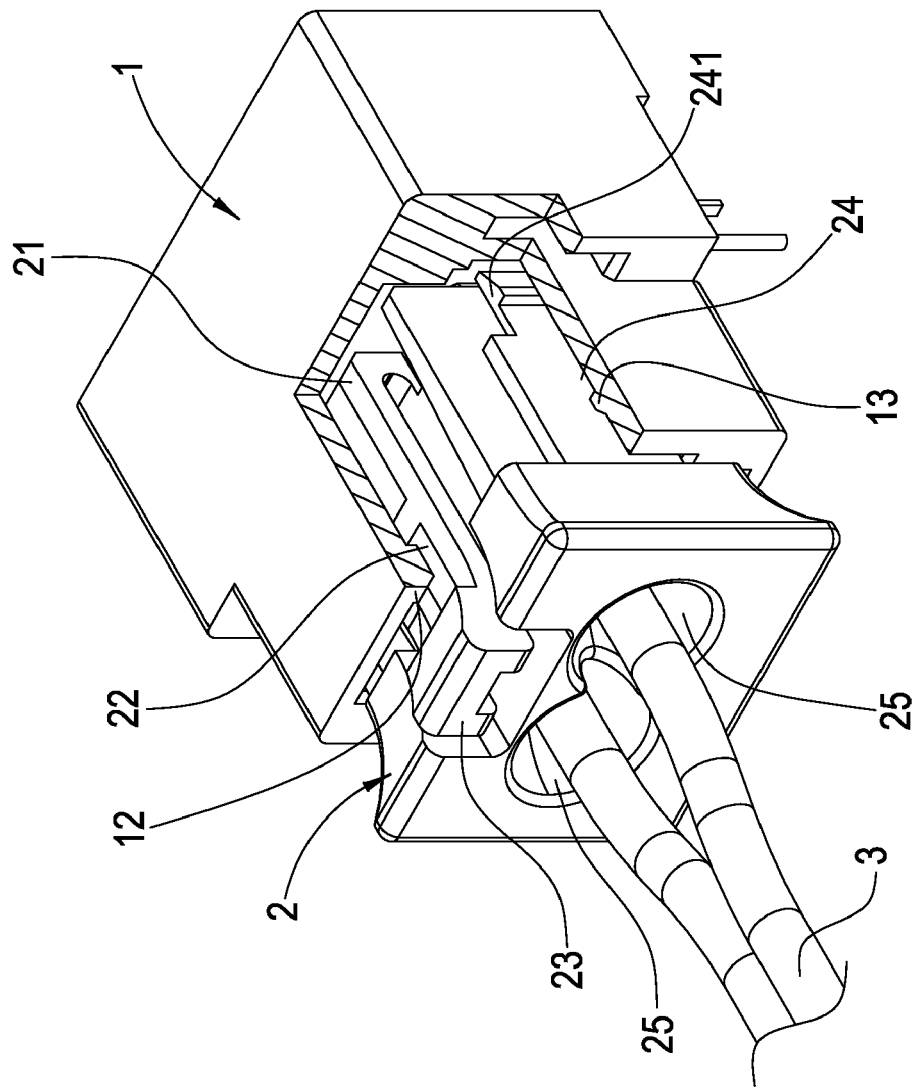
Figure 3C:
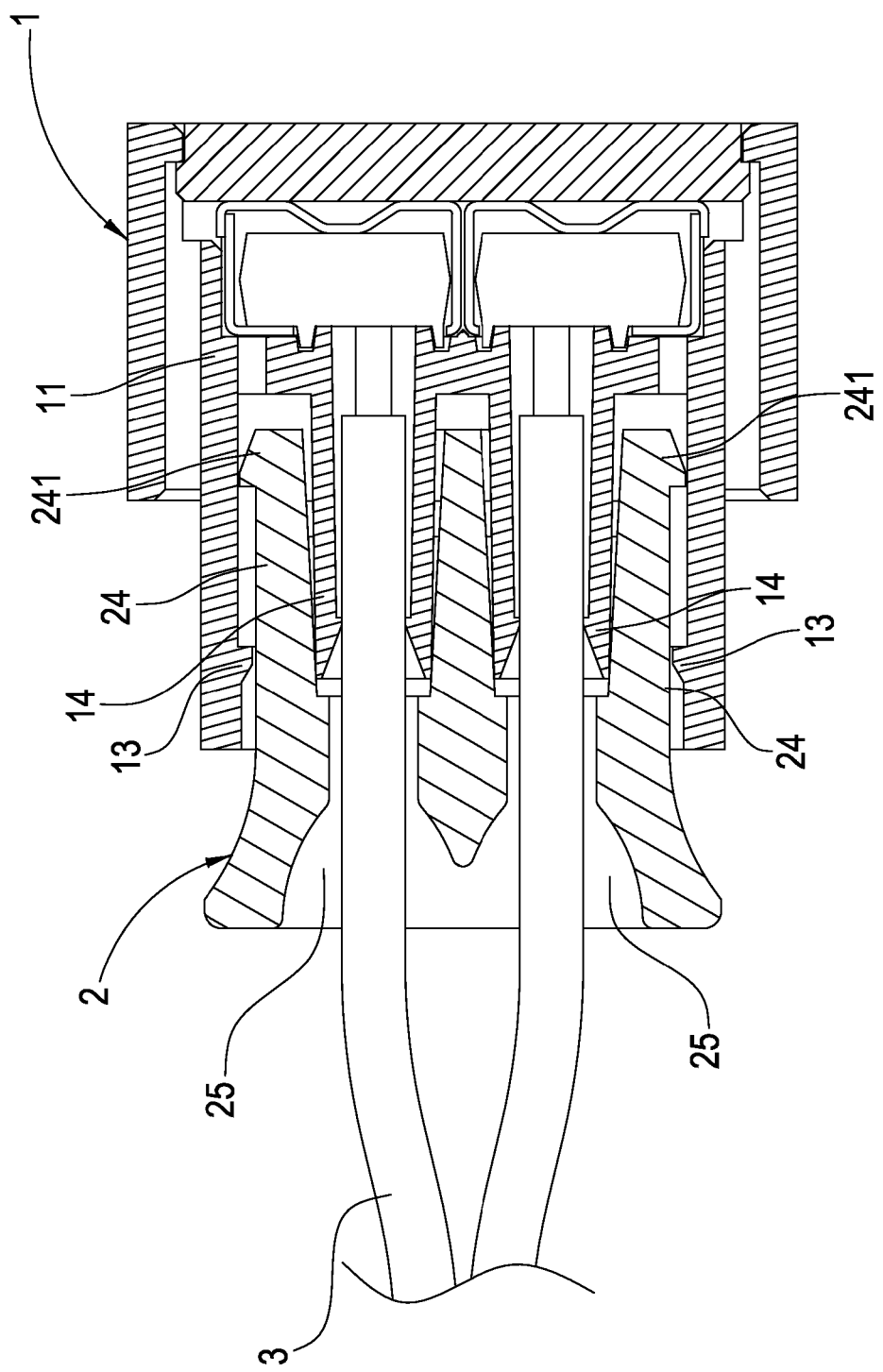

Please refer to FIGS. 3A, 3B, and 3C for implementation views of the fiber connector using the hooking structure, wherein the fiber cable is made of plastic fiber. As shown in FIG. 3A, the fiber positioning piece 2 is inserted in the socket 11 of the fiber connector 1, and the tab 241 of the tablet 24 at each side of the fiber positioning piece 2 leans against the retaining portion 13 of the fiber connector 1 respectively to prevent the fiber positioning piece 2 breaking off from the socket 11; as shown in FIG. 3B, the fiber cable 3 is inserted through the fiber receptacle 25 of the fiber positioning piece 2 and is pushed inwardly until the fiber cable 3 is held by the fiber holding portion 14, meanwhile, the fiber positioning piece 2 is pushed towards the inside of the socket 11 until the fastening block 12 of the fiber connector 1 hooks with the buckling slot 22 of the spring plate 21 of the fiber positioning piece 2, the fiber holding portion 14 is pressed by the ever-shrinking diameter of the hole 26 as it goes deep further, therefore the fiber holding portion 14 could firmly hold the fiber cable 3 (as shown in FIG. 3C). Through the hooking and holding mechanism of the present invention, the fiber positioning piece 2 is firmly held in the socket 11 of the fiber connector 1. When a user wishes to pull out the fiber cable 3, he/she only needs to press the pressing portion 23 at the end portion of the spring plate 21 to let the fastening block 12 of the fiber connector 1 break away from the buckling slot 22 of the fastening block 12 and to pull out the fiber positioning piece 2, meanwhile the tab 241 of the fiber positioning piece 2 is retained by the retaining portion 14 to prevent the fiber positioning piece 2 from completely leaving the socket 11 of the fiber connector 1; however, the user still can pull out the fiber cable 3 from the fiber receptacle 25 to restore the implementation as shown in FIG. 3A.

Therefore, the implementation lets the fiber connector 1 firmly hook with the fiber positioning piece 2 and effectively hold the fiber cable 3 to prevent the fiber cable 3 breaking off from the fiber connector due to loose fiber positioning piece 2.

The present invention discloses a fiber connector using a hooking structure, while compared with other prior art fiber connectors, is advantageous in:

1. The present invention provides a fiber connector using a hooking structure to let the fiber connector firmly hook with a fiber positioning piece and effectively hold the fiber cable to prevent the fiber cable breaking off from the fiber connector due to loose fiber positioning piece.

2. The present invention provides a hooking structure which can firmly hold the fiber cable to prevent the fiber cable breaking off from the fiber connector due to external forces exerted by users who accidentally pull or drag the fiber cable.

3. The present invention provides a fiber connector using a hooking structure, which is simple in structure and easy to operate.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A fiber connector using a hooking structure, comprising:
a fiber connector having an opening and a rear side opposite to the opening, the fiber connector defining a socket therein and having a fastening block formed inside the socket and a retaining portion disposed at each of two opposing inner sides of the socket respectively, the fiber connector further having at least one fiber holding portion extending from the rear side towards the opening of the socket; and
a fiber positioning piece to be received in the socket of the fiber connector, the fiber positioning piece having a spring plate extending to be engaged with the fiber connector from the opening thereof, a buckling slot formed on the spring plate, a pressing portion at one end of the spring plate, a tablet extending along each of two opposing sides corresponding to the retaining portions of the fiber connector, each of the tablets having a tab disposed at an end portion thereof, the fiber positioning piece further having at least one fiber receptacle for telescoping the fiber holding portion of the fiber connector therein.

2. The fiber connector using the hooking structure as claimed in claim 1, wherein the fastening block of the fiber connector is to be engaged with the spring plate at the buckling slot of the fiber positioning piece.

3. The fiber connector using the hooking structure as claimed in claim 1, wherein the tab leans against the retaining portion of the fiber connector.

\* \* \* \* \*